E. F. BEAL.
COMBINED BAKING RIM AND VESSEL.

No. 195,080.          Patented Sept. 11, 1877.

WITNESSES          INVENTOR
Villette Anderson,      Ezra F. Beal,
Jno. D. Patten,      by E. W. Anderson,
         ATTORNEY

UNITED STATES PATENT OFFICE.

EZRA F. BEAL, OF POLAND, ASSIGNOR OF ONE-HALF HIS RIGHT TO THOMAS B. SWAN, OF MINOT, MAINE.

IMPROVEMENT IN COMBINED BAKING RIM AND VESSEL.

Specification forming part of Letters Patent No. 195,080, dated September 11, 1877; application filed July 7, 1877.

*To all whom it may concern:*

Be it known that I, EZRA F. BEAL, of Poland, in the county of Androscoggin and State of Maine, have invented a new and valuable Improvement in Combined Baking Rim and Vessel; and I do hereby declare that the following is a full, clear, and exact description of the construction and operation of the same, reference being had to the annexed drawings, making a part of this specification, and to the letters and figures of reference marked thereon.

Figure 1:
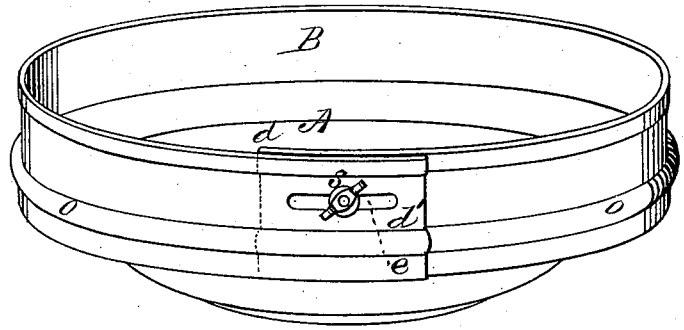
Figure 2:
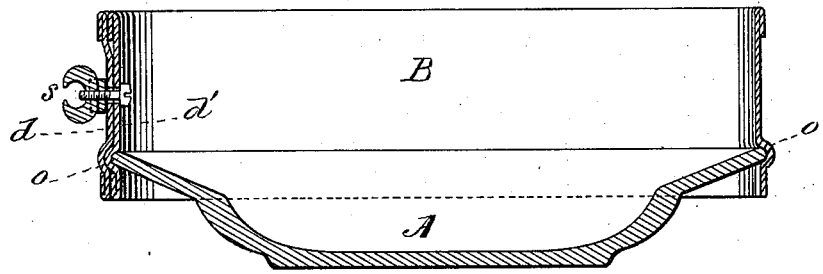

Figure 1 of the drawings is a representation of a perspective view of my improved rim applied to a plate, and Fig. 2 is a vertical sectional view thereof.

This invention has for its object to prevent the fillings of pies and tarts from breaking through the crust and running out when baking; and to obviate the breaking of the sides of cakes, which is usually caused by the sticking of the rim of the baking-pan.

The invention consists in the construction and novel arrangement of an extensible and detachable rim, adapted to be fitted to the edge of a baking pan or plate, which projects below the lower edge of said band or rim, as hereinafter fully shown and described.

In the accompanying drawings, the letter A designates an ordinary baking pan or dish, as the case may be.

B represents the extensible and detachable rim, which is designed to be connected to the edge of the dish or pan A in the following manner: An internal channel or bead-groove is formed near the lower edge of the rim to receive the edge of the vessel, as indicated at *o*. The ends $d$ $d'$ of the rim are brought together, when the rim is placed around the edge of the vessel and fastened, preferably by means of a slot, *e*, and clamp-screw *s*, as thereby the rim may be adjusted to dishes of varying diameters.

When this rim is used it is not necessary to make the crust of a pie or tart thicker on the sides than on the bottom, as it effectually prevents the filling from running out. When the pie or cake is cooked the rim can be extended and loosed from its sides readily and without breaking or marring the same.

What I claim as my invention, and desire to secure by Letters Patent, is—

The combination of the extensible rim B, having the edge groove *o*, lapping ends $d$ $d'$, slot *e*, and clamp-screw, with the downwardly-extended dish or pan A, having its edge fitting into said groove, substantially as specified.

In testimony that I claim the above I have hereunto subscribed my name in the presence of two witnesses.

EZRA F. BEAL.

Witnesses:
   E. E. JORDN,
   CLARENCE E. LEMON.